United States Patent [19]

Moreau et al.

[11] Patent Number: 4,460,302

[45] Date of Patent: Jul. 17, 1984

[54] HANDLING EQUIPMENT COMPRISING A TELESCOPIC SUPPORTING ASSEMBLY CARRYING A MOTORIZED ORIENTATION SUPPORT FOR AT LEAST ONE ARTICULATED SLAVE ARM

[75] Inventors: Claude Moreau, Nantes; Daniel Francois, Vendome; Jean Vertut, Issy Les Moulineaux; Paul Marchal, Gif-Sur-Yvette; Gérard Streiff, Montfavet, all of

[73] Assignee: Commissariat a l'Energie Atomique, Paris, France

[21] Appl. No.: 262,920

[22] Filed: May 12, 1981

[30] Foreign Application Priority Data

May 14, 1980 [FR] France .................................. 80 10891

[51] Int. Cl.³ ................................................ B25J 3/04
[52] U.S. Cl. ........................................ 414/5; 414/749;
414/590; 358/100
[58] Field of Search ................... 414/589, 590, 686, 4,
414/5, 749, 750, 744 R, 744 A, 620–623;
318/640; 364/513, 478; 356/152, 400;
340/146.3 H; 358/100

[56] References Cited

U.S. PATENT DOCUMENTS

| 2,861,699 | 11/1958 | Youmans | 414/4 |
| 3,482,711 | 12/1969 | Böhme | 414/744 R |
| 4,187,051 | 2/1980 | Kirsch et al. | 414/744 R |

FOREIGN PATENT DOCUMENTS

| 226849 | 9/1962 | Austria . |
| 781465 | 8/1957 | United Kingdom . |
| 929352 | 6/1963 | United Kingdom . |
| 1455782 | 11/1976 | United Kingdom . |

Primary Examiner—Robert J. Spar
Assistant Examiner—Terrance L. Siemens
Attorney, Agent, or Firm—Kerkam, Stowell, Kondracki & Clarke

[57] ABSTRACT

A handling equipment comprising a telescopic supporting assembly carrying a motorized orientation support for at least one articulated slave arm is disclosed. The orientation support includes a body pivotally mounted around a vertical axis at the end of the supporting assembly and at least one supporting member pivotally mounted around a horizontal axis on the body. A fixing device is provided between each slave arm and each supporting member to allow remote locking and unlocking of the slave arms. The supporting assembly bears at least one television camera for observing the free end of each slave arm.

15 Claims, 7 Drawing Figures

HANDLING EQUIPMENT COMPRISING A TELESCOPIC SUPPORTING ASSEMBLY CARRYING A MOTORIZED ORIENTATION SUPPORT FOR AT LEAST ONE ARTICULATED SLAVE ARM

The invention relates to handling equipment enabling work to be carried out accurately in places difficult to access and in hostile surroundings, and also to a motorized orientation support which forms an important part of the handling equipment.

At the present day many types of handling equipment exist which are used in hostile or dangerous surroundings, inter alia in the nuclear field, to carry out various remote-control handling operations. The type of handling equipment used is generally selected in relation to the precision of the work to be carried out and the size of the loads to be shifted, one or other of these values being given priority.

For instance, when high-capacity handling equipment is required, it is current practice to use heavy or motorized handling equipment. As a rule such equipment comprises a supporting assembly formed by a gantry whose carriage comprises a telescopic arm having directly at its lower end an articulated arm comprising two or three segments. The gantry and the telescopic arm forming the bearing assembly define three degrees of freedom, ensuring the positioning of the articulated arm in accordance with Cartesian co-ordinates, while the movements of the articulated segments are generally pivoting movements which give the articulated arm approximately the appearance of a human arm. The gantry can be horizontal and the telescopic arm vertical. Conversely, the gantry can be vertical, replaced by moving beams and a chariot which moves in a vertical plane, in which case the telescopic arm is horizontal. In all cases such high-capacity handling equipment is characterized by being adapted to low precision work. Moreover, such equipment always carries one single articulated arm.

In contrast, when accurate handling is to be carried out, currently use is made of fixed handling equipment of the master-slave type which reaches through the wall of the handling enclosure. Such handling equipment can now be replaced by a more recent generation of high-dexterity handling equipment, servo controlled and with feedback. This handling equipment has the same dexterity as fixed handling equipment and has the advantage of eliminating mechanical passage through the wall of the enclosures where the handling equipment carries out tasks which human beings cannot perform directly, since they can never enter the hostile, nuclear or similar surroundings. However, such high-precision handling equipment, which is not yet widely used, is generally attached directly to the base of a telescopic arm or any other existing lifting means, so that the equipment can sweep a relatively large space, although it cannot be used when access to the working zone is difficult either due to restricted space, or the need for a particular orientation.

This presentation of the various types of existing handling equipment indicates that there is no such equipment which combines at one and the same time the high-precision characteristics of master-slave type handling equipment, the facilities for positioning the active part of the handling equipment which are produced by the supporting assembly in heavy handling equipment, and the further facilities for orientation in relation to obstacles. Moreover, when handling requires the presence of two items of handling equipment in a place of difficult access, two supporting assemblies must be provided, each of which has an articulated arm.

The object of the present invention is to provide handling equipment which possesses at one and the same time the positioning facilities of gantry-type handling equipment with telescopic arms, the high-precision of handling equipment with servo control and feedback, and the further orientational possibilities, inter alia for getting round obstacles. More precisely, the proposal is to support at least one item of high-precision handling equipment by the supporting assembly of heavy pieces of handling equipment, placing a motorized orientation support between such items of handling equipment. The purpose of the orientational support is inter alia to allow two items of high-precision handling equipment or one item of high-precision handling equipment and an articulated positioning arm to be supported simultaneously, while enabling such items of handling equipment to be moved inside the enclosure, enabling them to approach the working zone, whatever the situation of the latter may be. The orientation support of the handling equipment according to the invention must also enable the articulated arm to be demounted and mounted by remote control and it must also bear observation means necessary for its use in the absence of direct viewing. To avoid all damage and facilitate repairs, the support must also be able in a very simple manner to guide the supply cables of the assembly and the cables transmitting signals delivered inter alia by the observation means.

To this end the invention proposes handling equipment of the kind comprising a supporting assembly defining three degrees of positioning freedom and at least one articulated slave arm having six degrees of freedom and supported by such supporting assembly and defining the six degrees of handling freedom, characterized in that the slave arm is supported by the supporting assembly via a motorized orientation support comprising a body mounted to pivot around a substantially vertical axis on such supporting assembly, at least one supporting member mounted to pivot around a substantially horizontal axis on the body and supporting the slave arm via a fixing device which can be locked and unlocked by remote control, means for controlling the pivoting of the body around the substantially vertical axis, and means for controlling the pivoting of the supporting member around the substantially horizontal axis, and means borne by the supporting member for observing the free end of the slave arm. In one embodiment of the invention it also comprises supply and communication cables extending from the supporting assembly and wound on at least one pulley rigidly connected to the body and centred on the pivoting axis thereof.

According to a secondary feature of the invention, it also comprises second observation means which are disposed vertically above the slave arm and rotate together with the body around its pivoting axis. Preferably the observation means are formed by at least one television camera of orientable axis. The television camera can be controlled from outside or directly by the movement of the handling equipment.

In a preferred embodiment of the invention it comprises two supporting members disposed on either side of the body and mounted to pivot around the same substantially horizontal axis, each of the supporting members bearing a slave arm and a means for observing the free end of such arm. In that case the pivoting of each supporting member can be controlled independently, for instance, by two different step-down motors.

According to another secondary feature of the invention the device for fixing the slave arm on the supporting member also comprises a pivoting axis perpendicular to the substantially horizontal axis, and means for controlling the pivoting of the slave arm around such axis.

In a first variant of the invention, in which the supporting assembly comprises a vertical telescopic arm, the pivoting axis of the body coincides with the axis of the telescopic arm, the latter having at its lower end at least one return pulley with a horizontal axis over which the cable extends before being wound on the pulley rigidly connected to the body, the telescopic arm having at its upper end at least one unwinding assembly vertically aligned with the return pulley, in order to ensure the tensioning of the cable.

In a second variant embodiment of the invention, in which the supporting assembly comprises a horizontal telescopic arm, the body is mounted to pivot around the free end of such arm, the latter bearing at its upper end at least one unwinding assembly horizontally aligned with such pulley, so as to ensure the tensioning of the cable.

The invention also relates to a motorized orientation support provided for use in handling equipment of the kind specified.

Various embodiments of the invention will now be described by way of nonlimitative example, with reference to the accompanying drawings, wherein.

Figure 1:
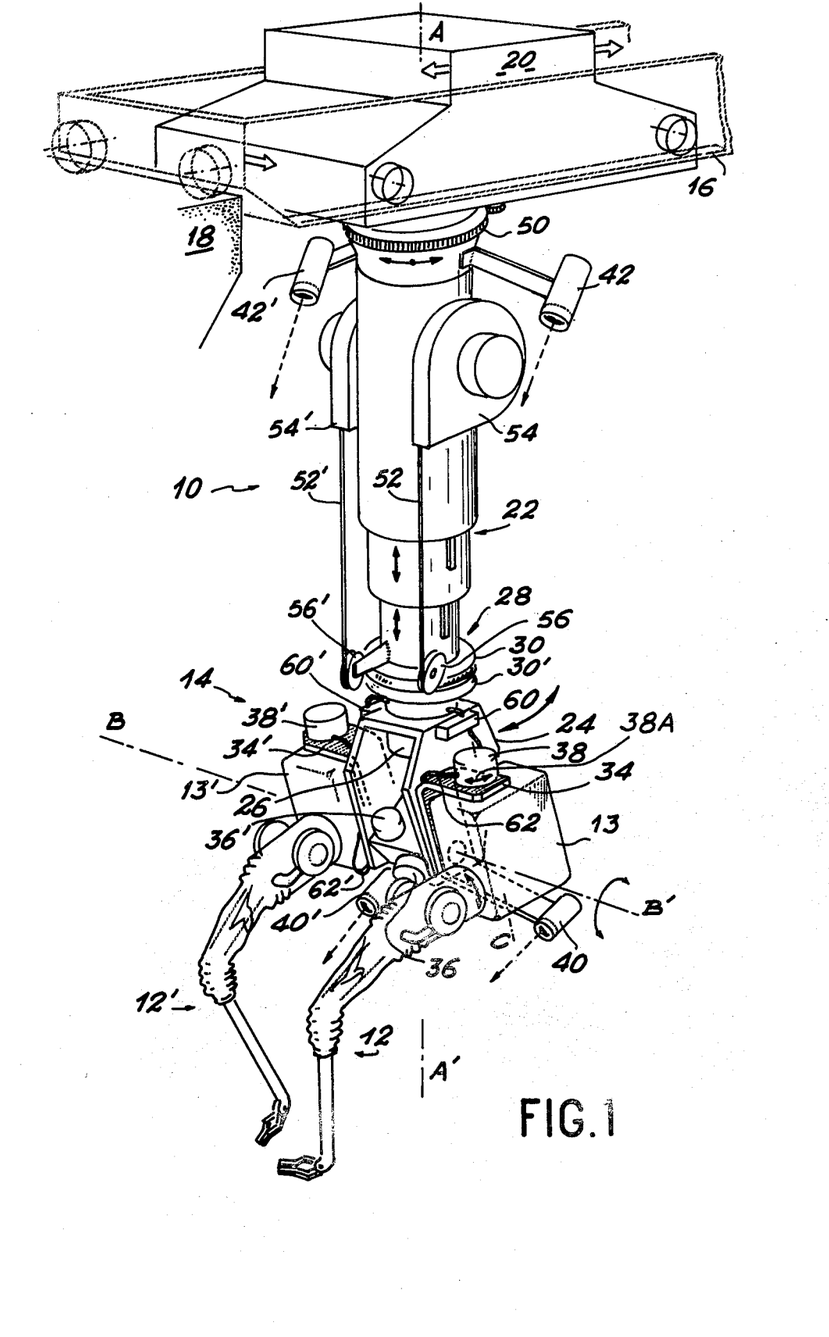
FIG. 1 is a perspective view of an item of handling equipment, illustrating a first embodiment of the invention.
Figure 2:
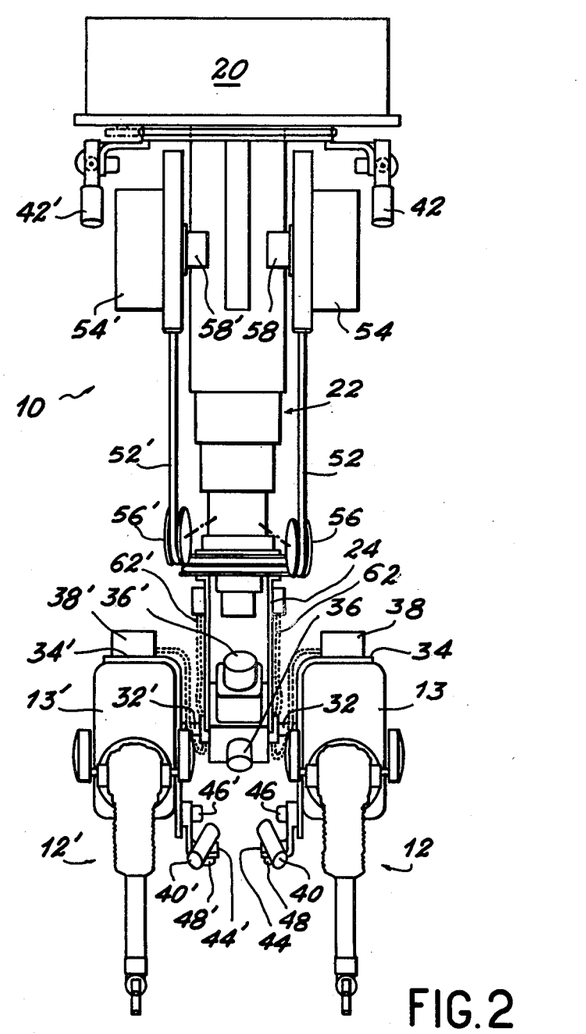
FIG. 2 is a front elevation of the embodiment of FIG. 1 showing the telescopic arm, the motorized orientation support and slave arms borne thereby, the latter being shown diagrammatically, in the handling equipment illustrated in FIG. 1.
Figure 3:
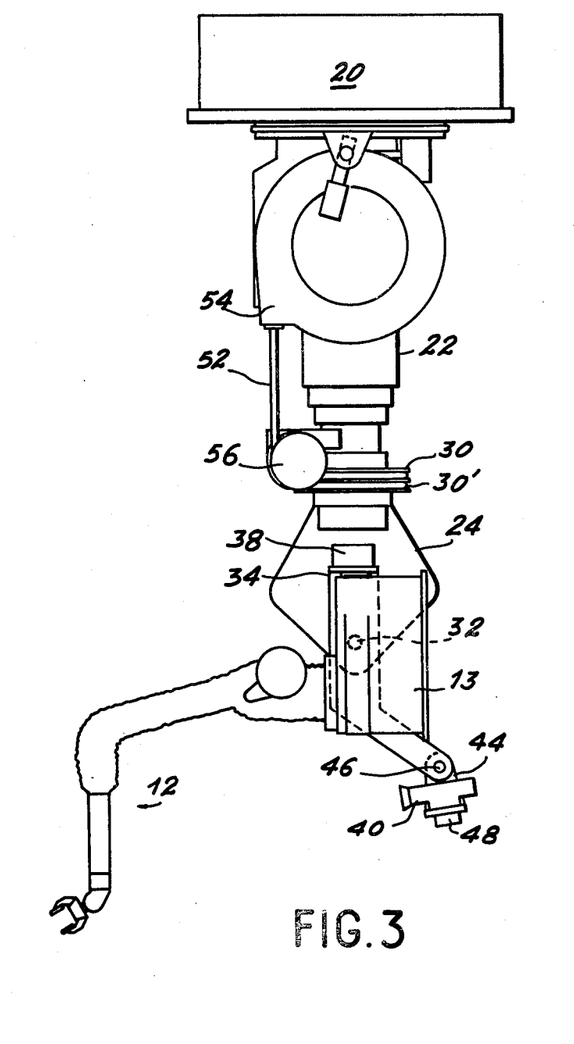
FIG. 3 is a side elevation of the parts of the handling equipment illustrated in FIG. 2.

FIGS. 1-3 show handling equipment comprising a supporting assembly 10, two articulated slave arms 12, 12' and a motorized orientation support 14 by means of which the articulated arms are mounted on the supporting assembly.

As already stated, the supporting assembly 10 corresponds to the supporting assembly of a heavy item of handling equipment of known type. In the embodiment illustrated in FIGS. 1-3 it comprises a horizontal gantry made up of beams 16 moving on rails 18 (only one shown) and the carriage 20 moving on the beam 16. The carriage 20 bears an extensible telescopic arm 22 defining a vertical axis A—A'. The supporting assembly 10 therefore defines at the lower end of the telescopic arm 22 three degrees of freedom, ensuring the positioning of that end in Cartesian co-ordinates.

According to the invention the telescopic arm 22 bears the orientation support 14 at its lower end. The orientation support comprises a body 24 in this embodiment formed by two parallel vertical plates symmetrical with respect to the axis A—A' of the arm 22. The body 24 is mounted to pivot around an axis coinciding with the axis A—A'. The rotation of the body 24 is controlled by a step-down motor 26 borne by the body 24; the step-down motor can be disposed below a flange 28 which is also rigidly connected to the body 24 and disposed in the upper part thereof. The flange 28 defines two superimposed pulleys 30, 30' whose axis coincides with the axis A—A'. The function of these pulleys will be explained hereinafter.

Each plate forming the body 24 bears in its lower part a pivoting axis 32, 32' (FIG. 2) which projects outwards in relation to the body 24. These axes define a common horizontal pivoting axis shown by the line B—B' in FIG. 1. Each of the axes 32, 32' bears a supporting member in the form of an angle iron 34, 34' respectively. The rotation of the supporting members 34, 34' is controlled independently by step-down motors 36, 36' which can be disposed between the plates forming the body 24. The axes 32, 32' are mounted at the end of one of the limbs of the angle iron defined by the corresponding supporting member 34, 34', the end of the other limb bearing the articulated slave arm 12, 12' via the agency of a fixing device 38, 38' which can be locked and unlocked by remote control on the bodies 13, 13' of the slave arms 12, 12'. This arrangement enables the pivoting axis B—B' to be brought close to the centre of gravity of the slave arm.

The object of the fixing device 38, 38' is to enable each slave arm 12, 12' to be mounted or demounted without bringing the assembly out of its working enclosure. The fixing devices 38, 38' must therefore at the same time ensure the mechanical fixing of the corresponding slave arm and the electric, pneumatic and/or hydraulic connections required for the control of the slave arm and the possible transmission of certain information.

Figures 5, 7:
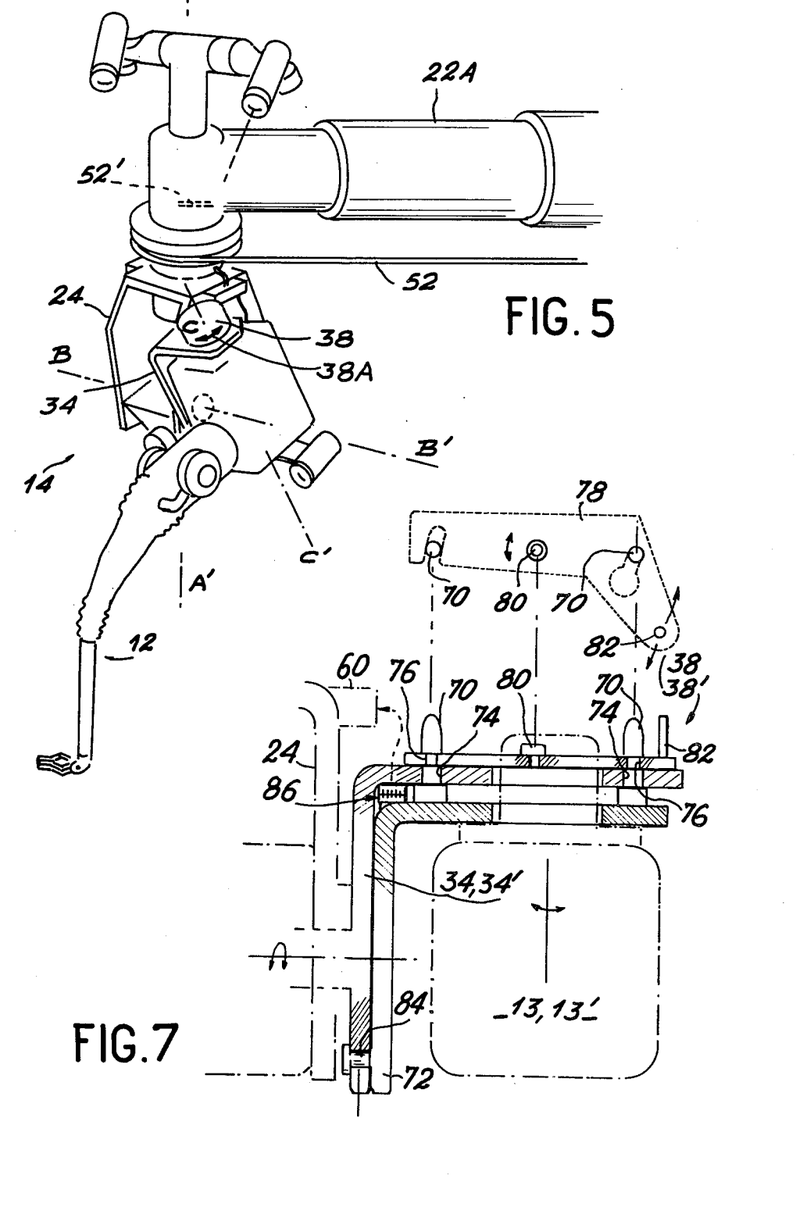
FIG. 5 is a perspective view diagrammatically illustrating a variant of the embodiment illustrated in FIG. 4.
FIG. 7 is a partially sectioned exploded view, showing a possible embodiment of the devices enabling the slave arms to be attached to the motorized orientation support in the variants previously illustrated.

As shown by way of example in FIG. 7, the fixing devices 38, 38' can comprise two fingers 70 extending vertically upwards from the upper limb of an angle iron 72 fixed above the body 13, 13' of the corresponding handling equipment. The fingers extend into holes 74 with which the upper limb of the supporting member 34, 34' is formed and projects above such limb, each finger having a groove 76 in which a lever 78 engages which is mounted to pivot at a place 80 on the corresponding member 34, 34'. To this end (FIG. 7) the lever 78 has notches in the form of arcs of circles at the level of the holes 74. The pivoting of the lever is remote-controlled by another item of handling equipment acting on a rod 82 of the lever. Mechanical fixing is completed by the engagement of a pin 84 attached to the vertical limb of the angle iron 72 in a suitable notch formed in the corresponding limb of the member 34,34' The electrical connections are made via a point 86 situated between the upper limbs of the angle irons 72 and 34, 34'.

The presence of the fixing devices also ensures that the articulated arms are interchangeable. Thus, as shown inter alia in FIG. 6, one of the arms 12, 12' can be replaced by an arm of a different type, such as arm 12'A. The handling equipment according to the invention can therefore have a high-precision slave arm 12 and a positioning arm 12'A which can have a higher capacity, but does not possess the same number of degrees of freedom.

In the variant embodiment illustrated in FIGS. 1-3, the orientation support 14 has two supporting members 34, 34' which each bear a slave arm formed by high-precision handling equipment. However, it will be understood that this embodiment is not limitative, and that the orientation support 14 could bear only one slave arm via the agency of a single supporting member.

The structure just described of the orientation support 14 according to the invention gives the bodies 13, 13' of each articulated slave arm two degrees of freedom of orientation which are added to the three degrees of positioning freedom of these bodies, obtained as a result of the supporting assembly 10. The slave arms can thus be moved close up to the working zone in the best orientation, even in the neighbourhood of considerable obstacles. It will be understood that all the handling according to the invention can thus be performed with higher precision in distant zones of difficult access.

The slave arms 12, 12' can be servo controlled handling equipment with feedback, like that disposed in French Pat. No. 74 25055 in the name of Commissariat a l'Energie Atomique and corresponding U.S. Pat. No. 4,078,670. Such a slave arm defines in known manner six degrees of handling freedom.

To enable action of this kind to be controlled in zones outside direct vision, observation means must be provided. The observation means comprise on the one hand a television camera 40,40' borne by each of the supporting members 34, 34' and on the other hand a television camera 42, 42' disposed substantially vertically above the corresponding arm 12, 12'.

More precisely, in the variant illustrated the television cameras 40, 40' are mounted on prolongations downwards and towards the rear of the limb of the angle iron formed by the supporting member 34, 34' which bears the pivoting axis 32, 32'. The cameras 40, 40' are borne by plates 44, 44' (FIGS. 2 and 3) provided to pivot around an axis 46, 46' which is parallel with the axis B—B' and is therefore horizontal. In relation to the plates 44, 44' the cameras 40, 40' can also pivot around an axis 48, 48' perpendicular to the axis 46, 46'. It will be understood that this arrangement enables the gripping member mounted at the free end of the articulated arm 12, 12' to be observed, whatever the position occupied by the arm may be. The orientation of the cameras 40, 40' around the pivoting axes 46, 46' and 48, 48' is controlled by suitable actuators. The actuators can be controlled manually or by the control members of the articulated arm.

In a variant which is not shown the cameras 40, 40' can be borne directly by the base of the motor unit 13, 13' of each of the slave arms 12, 12'. The connections of the control and signal-transmitting members are in that case made via the agency of the fixing device 38, 38'.

In the variant embodiment illustrated in FIGS. 1-3, the television cameras 42 and 42' are borne by a plate 50 disposed at the upper end of the telescopic arm 22. The plate 50 is adapted to co-rotate with the body 24, so that each of the cameras 42, 42' remains substantially vertically above each of the corresponding slave arms 12, 12'. For this purpose the plate 50 can be connected directly to the body 24 or be independent and have suitable control means.

According to another feature of the invention, means are provided to guide the supply cables and cables for transmitting orders and information to the step-down motors 26, 36 and 36' to the fixing devices 38, 38' of the articulated arms 12, 12' and to the cameras 40, 40' and also to the actuators associated therewith. These multi-conductor, composite cables 52 and 52' extend in known manner to the upper end of the telescopic arm 22 via the interior of the arm and pass through unwinding assemblies 54 and 54' disposed outside and on either side of the arm, their axes coinciding and being perpendicular to that of the arm 22. The unwinding assemblies 54 and 54' ensure the tensioning of the cables 52 and 52'. For this purpose they preferably comprise a large diameter pulley (not shown) over which two or three turns of the cable can be wound, and a dead zone in which a suitable spiral or helical cable length enables the variations in length of the cable to be absorbed. Such variations in length correspond to the whole of the travel of the telescopic arm 22, to which is added the maximum rotary travel of the orientation support 14 around the axis AA'. The variations also correspond to the cable length (2 or 3 turns) which can be wound on the large diameter pulley of the corresponding unwinding assembly 54, 54'. The return of the large diameter pulleys is performed by a known spring or motor torque system 58, 58' (FIG. 2).

On leaving the unwinding assemblies 54, 54' each cable 52, 52' descends vertically to a return pulley 56, 56' attached to the lower end of the arm 22. The cables 52, 52' are then fixed to the pulleys 30, 30' which rotate with the body 24 around the axis AA'. The pulleys 56, 56' thus enable the cables to be wound on the pulleys 30, 30' while remaining aligned with the unwinding assemblies 54, 54'. The cables 52, 52' can therefore leave via the inside of the pulleys 30, 30' and be connected to relay casings 60, 60' attached to the opposite faces of the plates forming the body 24. From the relay casings 60, 60' cables (not shown) directly supply the step-down motors 26, 36 and 36' and the cameras 40 and 40' when the latter are borne by prolongations of the members 34, 34', as shown in FIG. 1. Cables 62, 62' forming a loop in order to take into account the possible rotation of the supporting members 34, 34' around the axis BB' also connect the casings 60, 60' to the fixing devices 38, 38', in order to supply the means for actuating the handling equipment formed by the arms 12, 12'. The cables 62, 62' also ensure the operation of the television cameras when the latter are borne by the motor arms of the slave arms. This arrangement, which is a preferred feature of the invention, has the advantage of enabling the unwinding assemblies and cables to be replaced by remote control.

The or each cable might also be disposed in a spiral outside the telescopic tube 22 (a known practice), or they might be placed inside the tube 22, using unwinding assemblies disposed in the upper part of the carriage 20.

Figure 4:
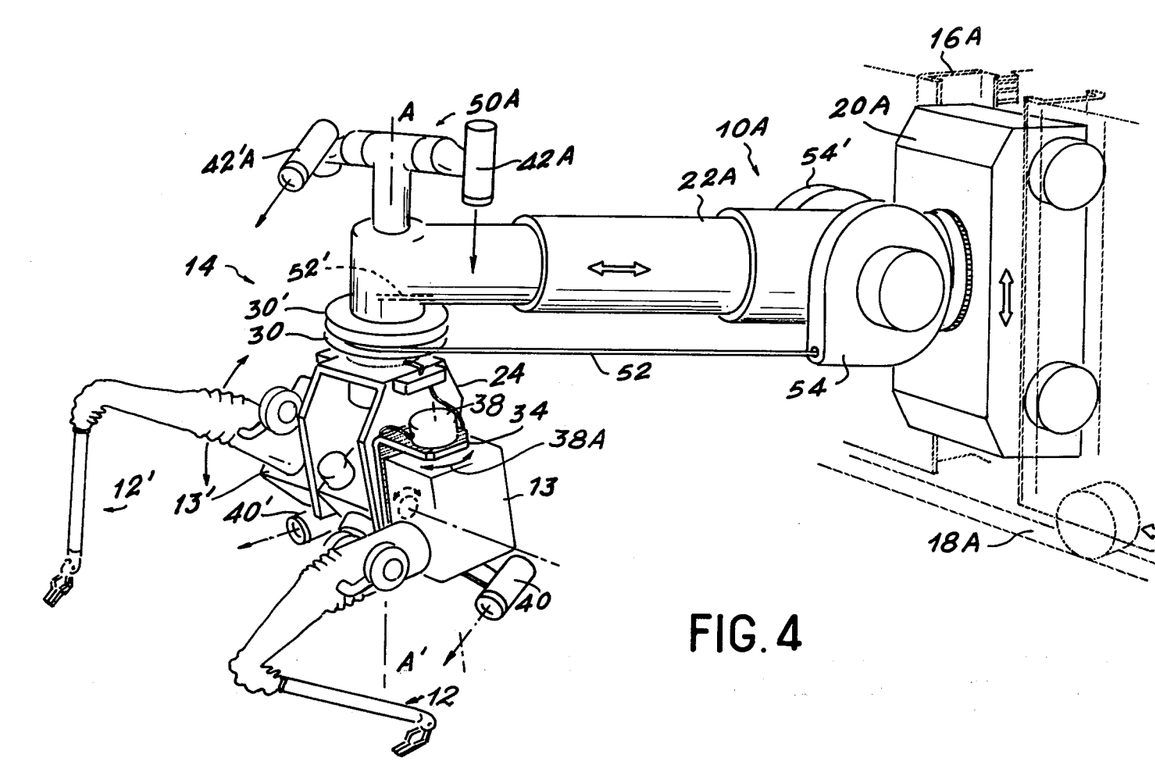
FIG. 4 is a perspective view of handling equipment illustrating a second embodiment of the invention.

In the variant embodiment illustrated in FIG. 4, the supporting assembly 10A differs from the supporting assembly 10 in FIGS. 1-3. For instance, the supporting assembly 10A comprises a vertical beam 16A which moves in a horizontal direction on guide rails 18A. The beam 16A bears a carriage 20A which moves vertically and supports a horizontal telescopic arm 22A.

As shown by FIG. 4, this difference in structure of the supporting assembly results in the pivoting axis AA' of the body 24, which is still vertical according to the invention, no longer coinciding with the axis of the telescopic arm, being perpendicular thereto. The orientation support 14 remains identical to that disclosed in detail in the preceding embodiment. However, since the axis of the arm 22A is perpendicular to the axis AA', the return pulleys are eliminated and the cables 52, 52', which emerge horizontally from the unwinding assemblies 54, 54' attached to that part of the arm 22A which is closest to the carriage 20A, are directly wound on the pulleys 30, 30' rigidly attached to the body 24. Another consequence of the change in structure of the supporting assembly is that the cameras 42A and 42'A which are disposed vertically above the articulated arms 12 and 12' are no longer mounted on the telescopic arm 22A, but on a structure 50A centred on the axis AA' and rigidly connected directly to the body 24 when it rotates around such axis. The structure 50A defines two diametrically opposite arms in relation to the axis AA' which bear at their free end orientational platforms (without references) on which the cameras 42A and 42'A are placed.

To illustrate the independence of the rotation of the supporting members 34 and 34' and the slave arms 12, 12' which they bear around the axis BB', FIG. 4 shows the case in which the left-hand arm 12 is slightly tilted downwards, the right-hand arm 12' being tilted upwards. The cameras 40 and 40' adopt corresponding orientations. It must be recalled that this difference in orientation of the arms 12 and 12' is allowed by the use of two distinct step-down motors to control the rotation of the members 34 and 34' around the axis BB'.

FIG. 5 shows a variant of the invention in which the supporting member 34 bears the articulated arm 12 via a fixing device 38 which can be constructed as disclosed hereinbefore, referring to FIG. 7. The fixing device 38 comprises a step-down motor enabling the slave arm 12 to pivot around a third axis CC' at right angles to the axis BB'. As shown by arrow 38A, the orientation support 14 then defines three degrees of freedom instead of two, as in the preceding embodiments. The end of the handling equipment 12 therefore has a freedom of transverse movement which enables the end of the arm 12, 12' to be brought close or moved away when the orientation support 14 bears two slave arms, contrary to what is shown in FIG. 5. This additional degree of freedom also enables the slave arm 12 to reach a more distant zone lying in a plane transverse of that defined by the supporting assembly when the latter is in the neighbourhood of an obstacle.

Figure 6:
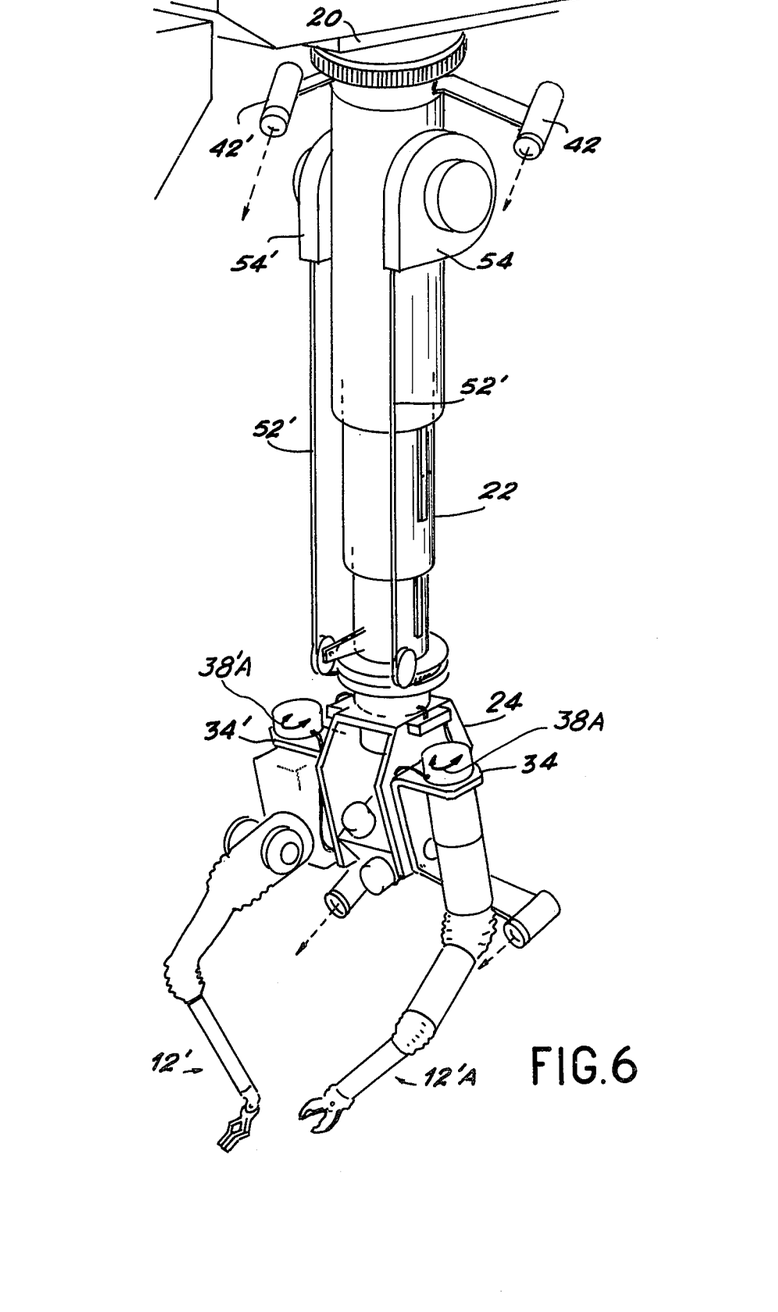
FIG. 6 is a perspective view illustrating another variant of the embodiment illustrated in FIG. 1.

This variant is shown in FIGS. 1, 4 and 6 in the form of an arrow 38A indicating the movement of the block 13 in relation to the support 34.

Of course the variants disclosed are non-limitative and can inter alia be combined without exceeding the scope of the invention.

We claim:

1. Handling equipment of the kind comprising a supporting assembly defining three degrees of positioning freedom and at least one articulated slave arm having six degrees of freedom and supported by such supporting assembly and defining the six degrees of handling freedom, characterized in that the equipment comprises a motorized orientation support disposed between the supporting assembly and the slave arm for supporting the slave arm on the supporting assembly, the motorized orientation support having two degrees of freedom of movement and comprising a body mounted to pivot around a substantially vertical axis on such supporting assembly, at least one supporting member mounted to pivot around a substantially horizontal axis on the body for supporting the slave arm, a fixing device which can be remotely locked and unlocked carried by the supporting member for removably connecting the slave arm to the supporting member, means for controlling the pivoting of the body around the substantially vertical axis, means for controlling the pivoting of the supporting member around the substantially horizontal axis, and observation means borne by the supporting member for observing the free end of the slave arm.

2. Handling equipment according to claim 1 characterized in comprising supply and communication cables extending from the supporting assembly and wound on at least one pulley rigidly connected to the body and centered on the pivoting axis thereof.

3. Handling equipment according to claim 2, characterized in comprising another observation means disposed vertically above the slave arm and so as to rotate together with the body around its pivoting axis.

4. Handling equipment according to claim 1, or claim 2, or claim 3, characterized in that the observation means comprises a television camera of orientable axis.

5. Handling equipment according to claim 1, characterized in comprising another supporting member, the two supporting members disposed on either side of the body and mounted to pivot around the same substantially horizontal axis, each of the supporting members bearing a slave arm and an observation means for observing the free end of such arm.

6. Handling equipment according to claim 5, characterized in that the means controlling the pivoting of the supporting members are distinct and enable the pivoting of each supporting member to be controlled independently of the pivoting of the other support member.

7. Handling equipment according to claim 1, characterized in that the device for fixing the slave arm on the supporting member also comprises a pivoting axis perpendicular to the substantially horizontal axis to afford a third degree of freedom of movement of the motorized orientation support, and means for controlling the pivoting of the slave arm around such axis.

8. Handling equipment according to claim 3, wherein the supporting assembly comprises a vertical telescopic arm, characterized in that the pivoting axis of the body coincides with the axis of the telescopic arm, the latter having at its lower end at least one return pulley with a horizontal axis over which a cable extends before being wound on the pulley rigidly connected to the body, the telescopic arm having at its upper end at least one unwinding assembly vertically aligned with the return pulley, in order to ensure the tensioning of the cable.

9. Handling equipment according to claim 8, characterized in that the other observation means are borne by a member rotating substantially with the body around the pivoting axis thereof, such member being disposed at the upper end of the telescopic arm.

10. Handling equipment according to claim 3, wherein the supporting assembly comprises a horizontal telescopic arm, characterized in that the body is mounted to pivot around the free end of such arm, the latter bearing at its upper end at least one unwinding assembly horizontally aligned with such pulley, so as to ensure the tensioning of a cable.

11. Handling equipment according to claim 10, characterized in that the other observation means are borne by a member rigidly connected to the body and disposed thereabove.

12. Handling equipment according to claim 1, characterized in that the fixing device is offset in relation to the pivoting axis of the corresponding supporting member.

13. Handling equipment of the kind comprising a supporting assembly defining three degrees of positioning freedom and at least one articulated slave arm having six degrees of freedom and supported by such supporting assembly and defining the six degrees of handling freedom, wherein the slave arm is supported on the supporting assembly by a motorized orientation support providing two additional degrees of freedom of movement, the motorized orientation support comprising a body mounted to pivot around a substantially vertial axis on such supporting assembly, two supporting members disposed on either side of the body and mounted to pivot around a common substantially horizontal axis, each of said supporting members bearing a slave arm and first observation means for observing the free end of such arm, means for controlling the pivoting of the body around a substantially vertical axis, and means for controlling the pivoting of the supporting members around the substantially horizontal axis, said means for controlling the pivoting of the supporting members being distinct and enabling the pivoting of each supporting member to be controlled independently of the pivoting of the other supporting member, and each supporting member bearing its corresponding slave arm by a fixing device which can be remotely locked and unlocked for removably connecting the slave arm to the supporting member.

14. Handling equipment according to claim 13 further comprising second observation means disposed vertically above each slave arm and rotating together with the body around the substantially vertical axis.

15. Handling equipment according to claim 13, wherein each device for fixing a slave arm on the corresponding supporting member also comprises a pivoting axis perpendicular to the substantially horizontal axis to provide a third degree of freedom of movement for the motorized orientation support, and means for controlling the pivoting of the slave arm around said perpendicular pivoting axis.

* * * * *